United States Patent
Liao et al.

(10) Patent No.: US 8,502,952 B2
(45) Date of Patent: Aug. 6, 2013

(54) COLOR CHOLESTERIC LIQUID CRYSTAL DISPLAY DEVICES AND FABRICATION METHODS THEREOF

(75) Inventors: Yuan-Chang Liao, Yunlin County (TW); Yu-Cheng Lai, Taichung (TW); Yi-Shou Tsai, Taipei (TW); Kuan-Wei Wu, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 372 days.

(21) Appl. No.: 12/969,508

(22) Filed: Dec. 15, 2010

(65) Prior Publication Data

US 2011/0187982 A1    Aug. 4, 2011

Related U.S. Application Data

(63) Continuation-in-part of application No. 11/950,270, filed on Dec. 4, 2007, now Pat. No. 7,864,285.

(30) Foreign Application Priority Data

Apr. 14, 2007  (TW) .............................. 96113193 A

(51) Int. Cl.
  *G02F 1/1347* (2006.01)
  *G02F 1/1335* (2006.01)
  *G02F 1/1339* (2006.01)
  *G02F 1/1341* (2006.01)

(52) U.S. Cl.
  USPC .............. 349/156; 349/79; 349/109; 349/189

(58) Field of Classification Search
  USPC .............. 349/78, 79, 106, 108, 109, 156, 189
  See application file for complete search history.

(56) References Cited

U.S. PATENT DOCUMENTS

| 4,973,373 | A | 11/1990 | Hashimoto et al. |
| 5,757,456 | A | 5/1998 | Yamazaki et al. |
| 5,825,451 | A | 10/1998 | Ma et al. |

(Continued)

FOREIGN PATENT DOCUMENTS

| EP | 0703485 B1 | 6/2002 |
| TW | 577800 | 3/2004 |

(Continued)

OTHER PUBLICATIONS

Taiwan Patent Office, Office Action, Patent Application Serial No. 096113193, Jan. 23, 2011, Taiwan.

(Continued)

*Primary Examiner* — Edward Glick
*Assistant Examiner* — Dennis Y Kim

(57) ABSTRACT

Color cholesteric liquid crystal display devices and fabrication methods thereof are provided. The color cholesteric liquid crystal display device includes a first substrate, a second substrate and a gap interposed therebetween. A patterned enclosed structure, formed by adhering a first patterned enclosed structure on the first substrate and a second patterned enclosed structure on the second substrate, is interposed between the first substrate and the second substrate, dividing a plurality of color sub-pixel channels. A plurality of the color cholesteric liquid crystals are respectively filled into each of the color sub-pixel channel, wherein the first patterned enclosed structure is tightly adhered to the second patterned enclosed structure so as to prevent mixing of the color cholesteric liquid crystals between adjacent color sub-pixel channels.

19 Claims, 15 Drawing Sheets

U.S. PATENT DOCUMENTS

| | | | |
|---|---|---|---|
| 5,943,113 A | 8/1999 | Ichihashi | |
| 6,061,117 A * | 5/2000 | Horie et al. | 349/156 |
| 6,285,434 B1 | 9/2001 | Ma et al. | |
| 6,337,761 B1 * | 1/2002 | Rogers et al. | 359/296 |
| 6,369,867 B1 | 4/2002 | Ge | |
| 6,377,321 B1 | 4/2002 | Khan et al. | |
| 6,741,321 B2 | 5/2004 | Jeong et al. | |
| 6,784,953 B2 | 8/2004 | Liang et al. | |
| 7,018,180 B2 | 3/2006 | Koo | |
| 7,243,599 B2 | 7/2007 | Yoo et al. | |
| 7,502,161 B2 * | 3/2009 | Chopra et al. | 359/296 |
| 7,864,285 B2 | 1/2011 | Liao et al. | |
| 8,102,499 B2 | 1/2012 | Liao et al. | |
| 2001/0055076 A1 | 12/2001 | Ochi et al. | |
| 2002/0126249 A1 | 9/2002 | Liang et al. | |
| 2003/0133069 A1 | 7/2003 | Jeong et al. | |
| 2004/0196416 A1 | 10/2004 | Cho et al. | |
| 2006/0268208 A1 | 11/2006 | Murakami et al. | |
| 2006/0288571 A1 | 12/2006 | Seo et al. | |
| 2007/0002266 A1 | 1/2007 | Seo et al. | |
| 2007/0026570 A1 | 2/2007 | Daniels et al. | |
| 2009/0128771 A1 | 5/2009 | Yang et al. | |
| 2011/0187982 A1 | 8/2011 | Liao et al. | |

FOREIGN PATENT DOCUMENTS

| | | |
|---|---|---|
| TW | 200504407 | 2/2005 |
| TW | 200534013 | 10/2005 |
| TW | 200603328 | 1/2006 |
| TW | 200638080 | 11/2006 |
| TW | 200941073 | 10/2009 |
| WO | WO 2006/100713 A1 | 9/2006 |

OTHER PUBLICATIONS

Office Action, U.S. Appl. No. 12/955,867, United States Patent and Trademark Office, May 16, 2011, US.

Fujitsu Develops World's First Film Substrate-based Bendable Color Electronic Paper featuring Image Memory Function, Jul. 13, 2005, Japan.

China Patent Office, Office Action, Patent Application Serial No. 200810168717.1, Oct. 27, 2010, China.

Taiwan Patent Office, Office Action, Patent Application Serial No. 096130311, Oct. 20, 2011, Taiwan.

Taiwan Patent Office, Office Action, Patent Application Serial No. 096130311, Mar. 23, 2012, Taiwan.

US Patent Office, Office Action, U.S. Appl. No. 12/338,845, Jul. 2, 2012, US.

* cited by examiner

COLOR CHOLESTERIC LIQUID CRYSTAL DISPLAY DEVICES AND FABRICATION METHODS THEREOF

CROSS REFERENCE TO RELATED APPLICATIONS

This application is a Continuation-In-Part of pending U.S. patent application Ser. No. 11/950,270, filed Dec. 4, 2007 and entitled "Color cholesteric liquid crystal display devices and fabrication methods thereof", which claims priority of Taiwan Patent Application No. 096113193, filed on Apr. 14, 2007, the entirety of which is incorporated by reference herein.

BACKGROUND

1. Field of the Disclosure

The disclosure relates to liquid crystal display (LCD) devices, and in particular to color cholesteric liquid crystal display devices and fabrication methods thereof.

2. Description of the Related Art

Liquid crystal display (LCD) devices have many advantages such as a smaller size, lighter weight and lower power consumption, and are applicable in a variety of electronic and communication devices including notebook computers, personal digital assistants (PDA), mobile phones and the like due to its lighter weight, thinner profile, and portability. Conventional reflective memorable color liquid crystal display devices are widely applicable in electronic books, electronic papers, and the likes. The structures and fabrication methods of conventional cholesteric liquid crystal display devices use a tri-layered red (R), green (G), and blue (B) pixel stacked structure corresponding to various different driving methods. However, stacking tri-layered R, G, and B pixels may result in optical aberration and misalignment during fabrication. Moreover, the tri-layered R, G, and B liquid crystal layer stacked structure are so complicated that layout of electrodes is difficult to design and an LCD panel using the stacked structure has a rigid port, resulting in an intricate fabrication processes and high fabrication costs.

Accordingly, the use of single layer color cholesteric liquid crystal display devices and fabrication methods thereof can effectively ameliorate optical aberration, simplify the fabrication process, and reduce fabrication costs. Particularly, the device is applicable to the field of the color flexible LCD devices. U.S. Pat. No. 5,825,451, the entirety of which is hereby incorporated by reference, discloses a single layer color cholesteric LCD device using a combination of light decomposable/polymerizable chiral agents and single layer cholesteric LC structure. The single layer color cholesteric LCD device is illuminated by a UV light disrupting or reducing contents of chiral agent at a single region to achieve colorizing of single layer cholesteric LCD device. However, the single layer color cholesteric LCD device is easily affected by ambient light deteriorating display stability thereof.

U.S. Pat. No. 6,741,321, the entirety of which is hereby incorporated by reference, discloses an LCD device using a single LC layer and a double substrate assembly process. Different color LC materials are respectively filled into LC channels during fabrication. However, the single layer LCD assembly is not sealed enough such that overflow occurs between adjacent LC channels resulting in color mixing and reduced color saturation.

FIG. 1A is a cross section of a conventional single layer color cholesteric LCD device. Referring to FIG. 1A, a conventional single layer color cholesteric LCD panel 2 includes a lower substrate 6 and an upper substrate 12 opposed to each other and with a gap therebetween. An enclosed structure 8 is interposed between the lower substrate 6 and the upper substrate 12, dividing a plurality of stripe color sub-pixel LC channels. A first electrode 4 and an alignment layer 14 are disposed on the lower substrate 6. A second electrode 10 and an alignment layer 14 are disposed on the upper substrate 6. The first electrode 4 and the second electrode 10 are substantially perpendicular to each other.

FIG. 1B is a schematic view of the lower substrate of the conventional single layer color cholesteric LCD device of FIG. 1A. In FIG. 1B, the enclosed structure 8 divides a plurality of (R, G, B) stripe color sub-pixel LC channels $C_R$, $C_G$, and $C_B$. Perpendicularly crossed segments 16 and 18 are disposed on one end of the LC channels $C_G$ and $C_B$ to seal the LC channels. After the lower substrate 6 and upper substrate 12 are assembled, the second end $L_2$ of the enclosed structure 8 are sealed by a sealant enclosing the LC channels $C_G$ and $C_B$, while the first end $L_1$ of the LC channels $C_R$ remains opened to serve as an LC filling opening. Each of the LC channels $C_R$, $C_G$, and $C_B$ is sequentially filled with respective color LC and sealed. Before filling each of the single layer color LC channels, however, conventional methods require sealing of the second end of the enclosed structure. Furthermore, when separately filling LC into the LC channels, different color LCs may overflow to adjacent LC channels and mix, thus resulting in color mixing and reduced color saturation.

BRIEF SUMMARY

One embodiment provides a color cholesteric liquid crystal display device, comprising: a first substrate having a first patterned enclosed structure thereon; a second substrate having a second patterned enclosed structure thereon, wherein the second patterned enclosed structure is mirror-symmetrical to the first patterned enclosed structure, and the first patterned enclosed structure is adhered to the second patterned enclosed structure for assembling the first and second substrates, thereby defining a plurality of color sub-pixel channels; and a plurality of color cholesteric liquid crystals are respectively filled into each of the color sub-pixel channels.

One embodiment provides a fabrication method for a color cholesteric liquid crystal display device, comprising: providing a first substrate having a first patterned enclosed structure thereon; providing a second substrate having a second patterned enclosed structure thereon, wherein the second patterned enclosed structure is mirror-symmetrical to the first patterned enclosed structure; adhering the first patterned enclosed structure to the second patterned enclosed structure for assembling the first and second substrates to define a first LC channel with a first opening, a second LC channel, and a third LC channel, wherein the first LC channel is longer than the second LC channel, and the second LC channel is longer than the third LC channel; filling a first color liquid crystal into the first LC channel and sealing the first LC channel with a first seal material; cutting the assembly to expose a second opening of the second LC channel; filling a second color liquid crystal into the second LC channel and sealing the second LC channel with a second seal material; cutting the assembly to expose a third opening of the third LC channel; and filling a third color liquid crystal into the third LC channel and sealing the third LC channel with a third seal material.

One embodiment provides a fabrication method for a color cholesteric liquid crystal display device, comprising: providing a first substrate having a first patterned enclosed structure thereon; providing a second substrate having a second patterned enclosed structure thereon, wherein the second patterned enclosed structure is mirror-symmetrical to the first patterned enclosed structure; adhering the first patterned enclosed structure to the second patterned enclosed structure for assembling the first and second substrates to define a first LC channel with a first opening, a second LC channel, and a third LC channel, wherein the first LC channel is longer than the second LC channel, and the second LC channel is longer than the third LC channel; filling a first color liquid crystal into the first LC channel; polymerizing the first color liquid crystal; cutting the assembly to expose a second opening of the second LC channel; filling a second color liquid crystal into the second LC channel; polymerizing the second color liquid crystal; cutting the assembly to expose a third opening of the third LC channel; filling a third color liquid crystal into the third LC channel; and polymerizing the third color liquid crystal.

One embodiment provides a fabrication method for a color cholesteric liquid crystal display device, comprising: providing a first substrate having a first patterned enclosed structure thereon; providing a second substrate having a second patterned enclosed structure thereon, wherein the second patterned enclosed structure is mirror-symmetrical to the first patterned enclosed structure; adhering the first patterned enclosed structure to the second patterned enclosed structure for assembling the first and second substrates to define a first LC channel with a first opening and a second LC channel, wherein the first LC channel is longer than the second LC channel; filling a first color liquid crystal into the first LC channel and sealing the first LC channel with a first seal material; cutting the assembly to expose a second opening of the second LC channel; and filling a second color liquid crystal into the second LC channel and sealing the second LC channel with a second seal material.

One embodiment provides a fabrication method for a color cholesteric liquid crystal display device, comprising: providing a first substrate having a first patterned enclosed structure thereon; providing a second substrate having a second patterned enclosed structure thereon, wherein the second patterned enclosed structure is mirror-symmetrical to the first patterned enclosed structure; adhering the first patterned enclosed structure to the second patterned enclosed structure for assembling the first and second substrates to define a first LC channel with a first opening and a second LC channel, wherein the first LC channel is longer than the second LC channel, and the second LC channel is longer than the third LC channel; filling a first color liquid crystal into the first LC channel; polymerizing the first color liquid crystal; cutting the assembly to expose a second opening of the second LC channel; filling a second color liquid crystal into the second LC channel; and polymerizing the second color liquid crystal.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

The following description is of the embodiment of carrying out the disclosure. This description is made for the purpose of illustrating the general principles of the disclosure and should not be taken in a limiting sense. The scope of the disclosure is best determined by reference to the appended claims.

Figure 1A:
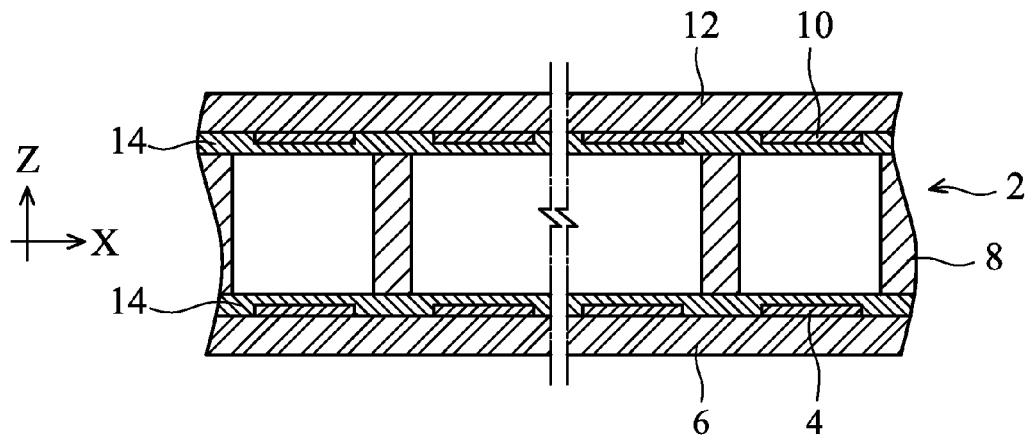
FIG. 1A is a cross section of a conventional single layer color cholesteric LCD device.
Figure 1B:
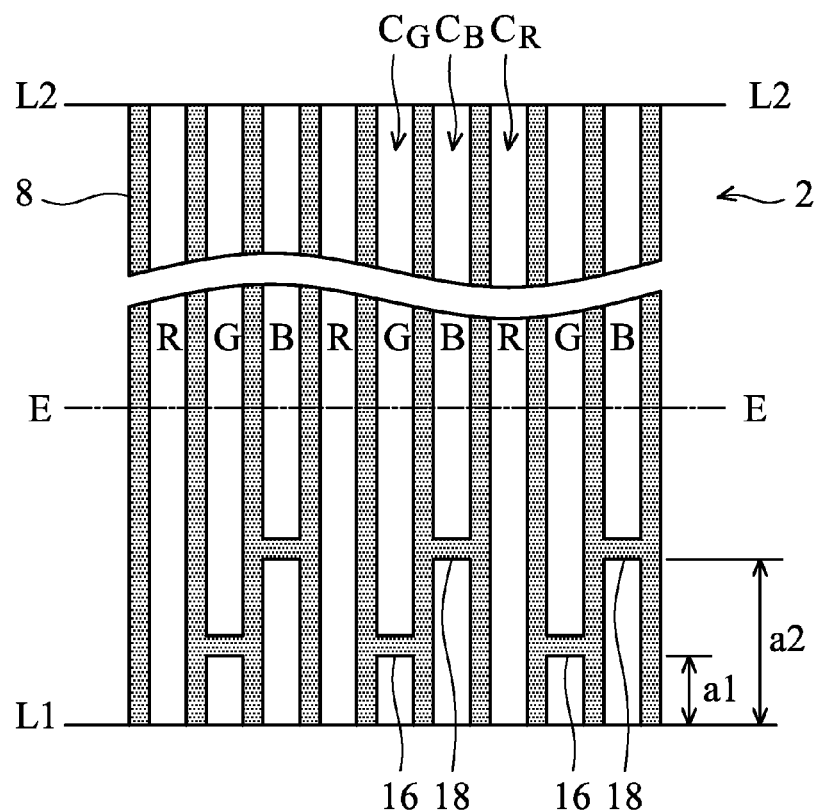
FIG. 1B is a schematic view of the lower substrate of the conventional single layer color cholesteric LCD device of FIG. 1A.
Figure 2:
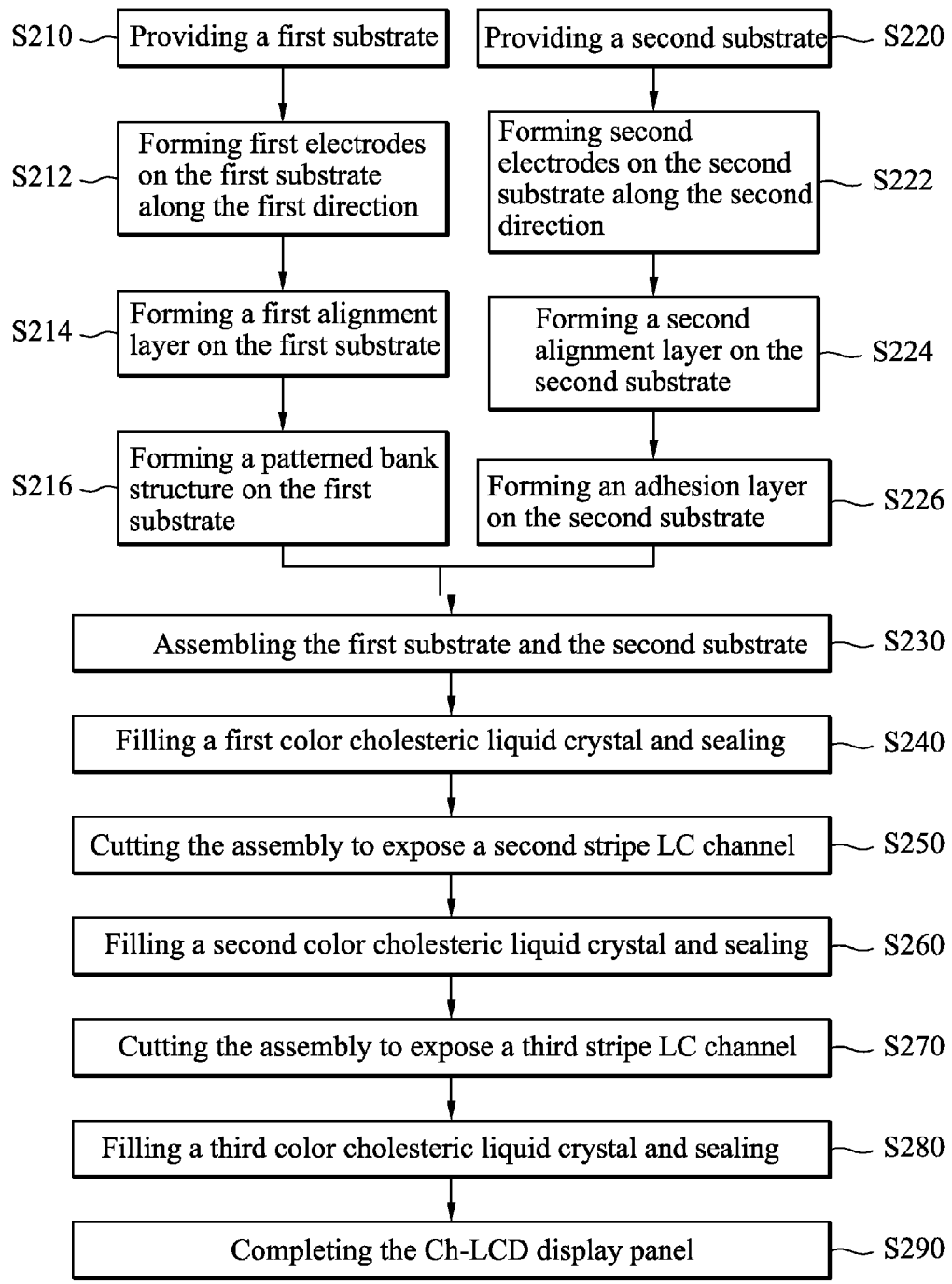
FIG. 2 is a flowchart illustrating an exemplary embodiment of a fabrication method for a single layer color cholesteric LCD device according to the disclosure.

FIG. 2 is a flowchart illustrating an exemplary embodiment of a fabrication method for a single layer color cholesteric LCD device according to the disclosure. First, preparation of a first substrate structure (such as an upper substrate structure) is conducted including providing a first substrate (S210) and forming a patterned first electrode along the first direction on the first substrate (S212). Subsequently, a first alignment layer is formed on the first substrate covering the first electrode (S214). A patterned enclosed structure or a bank structure is then formed on the first substrate (S216). The patterned enclosed structure includes a plurality of stripe wall structures, and one end of each stripe wall structure is connected to and perpendicular to a straight seal line, thereby dividing a first LC channel with a first opening, a second closed LC channel, and a third closed LC channel.

Preparation of a second substrate structure (such as a lower substrate structure) is conducted including providing a second substrate (S220) and forming a patterned second electrode along the second direction on the second substrate (S222). A second alignment layer is formed on the second substrate covering the second electrode (S224), and an adhesion layer is formed overlying the second substrate (S226).

The first and second substrate structures are assembled opposite to each other with a gap interposed therebetween (S230). The patterned enclosed structure and the adhesion layer are tightly combined to prevent filling of the color LCs in adjacent LC channels from overflowing. A first color cholesteric LC is filled in a first stripe LC channel and then sealed (S240). The assembly structure is cut to expose a second stripe LC channel (S250). A second color cholesteric LC is filled in the second stripe LC channel and then sealed (S260). The assembly structure is cut to expose a third stripe LC channel (S270). A third color cholesteric LC is filled in the third stripe LC channel and then sealed (S280). After all the three color cholesteric LCs are filled and sealed, fabrication of the single layer color cholesteric LCD device is completed (S290).

Figure 3A:
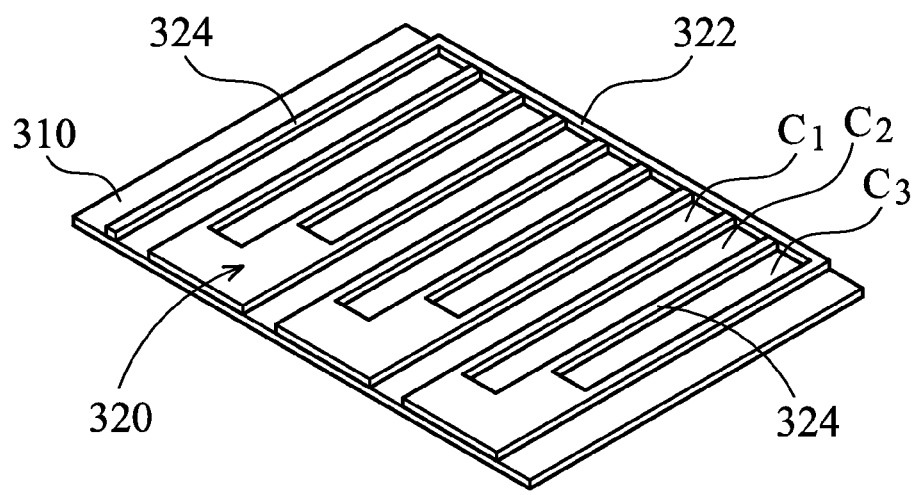
FIGS. 3A-3D are schematic views of an exemplary embodiment of each assembly step of the first and second substrate structures of the disclosure.

FIGS. 3A-3D are schematic views of an exemplary embodiment of each assembly step of the first and second substrate structures of the disclosure. Referring to FIG. 3A, a patterned enclosed structure 320 or a bank structure is formed on the first substrate (310). The patterned enclosed structure 320 comprises a plurality of stripe wall structures 324. One end of each stripe wall structures 324 connects to and is perpendicular to a straight end line 322 to divide a first LC channel $C_1$ with a first LC filling opening, a second closed LC channel $C_2$, and a third closed LC channel $C_3$. The length of the first LC channel $C_1$ exceeds that of the second LC channel $C_2$, and the length of the second LC channel $C_2$ exceeds that of the third LC channel $C_3$. The first substrate can be made of rigid substrates or flexible substrates. For example, the flexible substrates comprise polycarbonate (PC) substrates, polyethersulfone (PES) substrates, polyethylene terephthalate (PET) substrates, and polyimide (PI) substrates.

The first substrate may further comprise circuit elements for controlling pixel electrodes such as a thin film transistor (TFT) and a capacitor. Alternatively and optionally, the first substrate comprises pixel electrodes such as linear first electrodes along a first direction and a first alignment layer overlying the first substrate. The patterned enclosed structure can be formed by any well-known patterning processes such as lithography and screen printing, and can be made of a photoresist material.

Figure 3B:
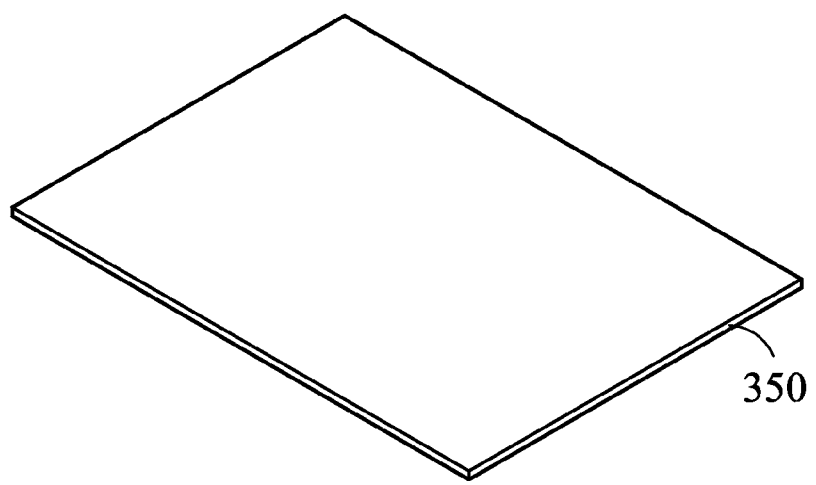
Figure 3C:
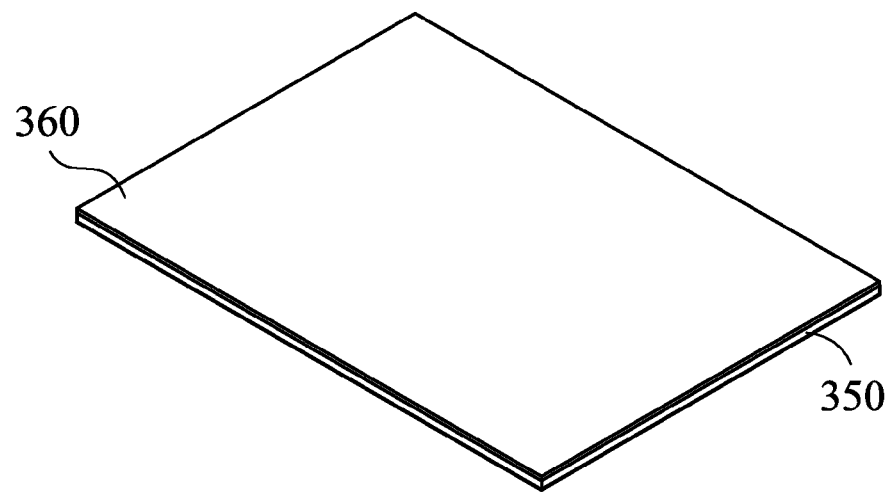

Referring to FIG. 3B, a second substrate 350 including a rigid substrate or a flexible substrate is provided. The second substrate 350 can comprises common electrodes, such as linear second electrodes along a second direction and a second alignment layer overlying the second substrate. The first direction and the second direction are substantially perpendicular to each other. Subsequently, an adhesion layer 360 is formed on the second substrate 350 as shown in FIG. 3C. The adhesion layer 360 is made of a glue material and a solidified material. For example, the solidified material comprises a light solidified material or a thermosetting material. The thickness of the adhesion layer 350 is less than the thickness (height) of the patterned enclosed structure 320.

Figure 3D:
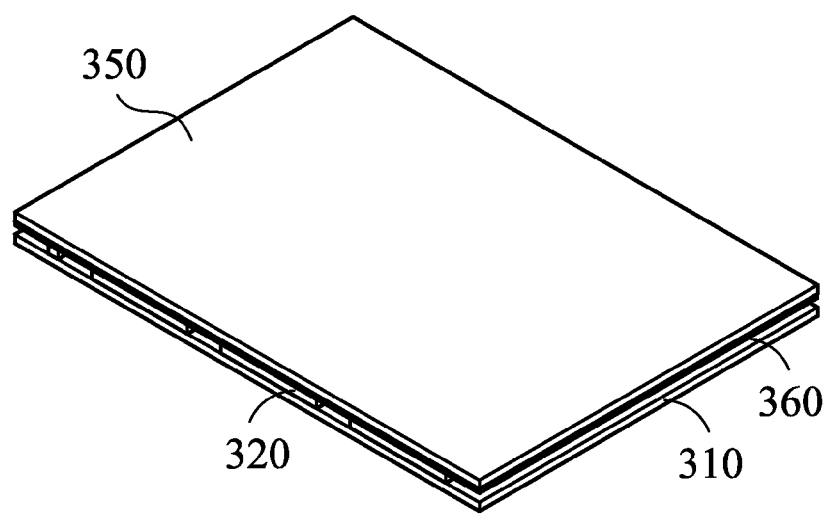

Referring to FIG. 3D, the first substrate 310 and second substrate 350 are assembled opposing each other such that the patterned enclosed structure 320 and the adhesion layer 360 are tightly combined to prevent LC overflow between adjacent LC channels during filling of the color LCs.

Figure 4:
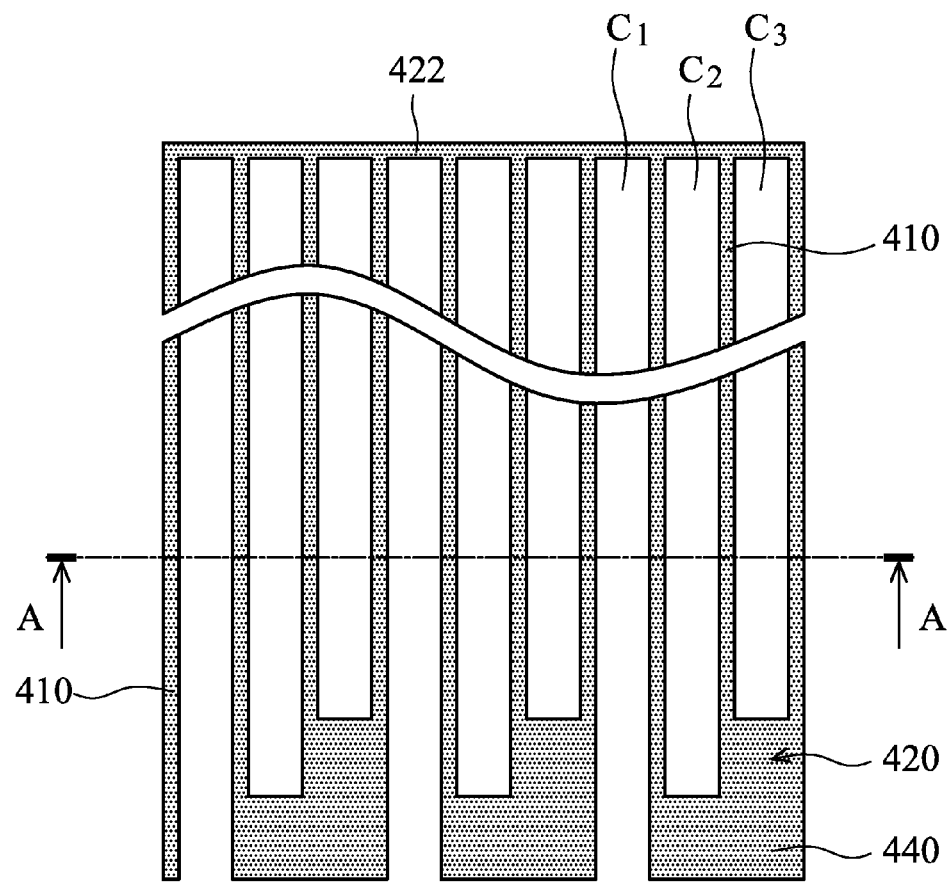
FIG. 4 is a plan view of an embodiment of the enclosed structure of the disclosure.

FIG. 4 is a plan view of an embodiment of the enclosed structure of the disclosure. In FIG. 4, a patterned enclosed structure 420 comprises a plurality of stripe wall structures 410. One end of each stripe wall structures 410 connects to and is perpendicular to a straight end line 422 and the other end of the stripe wall structures 410 connects to a bulk region 440, thereby dividing a first LC channel $C_1$ with a first LC filling opening, a second closed LC channel $C_2$, and a third closed LC channel $C_3$. The length of the first LC channel $C_1$ exceeds that of the second LC channel $C_2$, and the length of the second LC channel $C_2$ exceeds that of the third LC channel $C_3$. The bulk region 440 can enhance adhesion between the patterned enclosed structure and the adhesive layer, thereby preventing the overflow of LCs between adjacent LC channels during filling of the color LCs.

Figure 5:
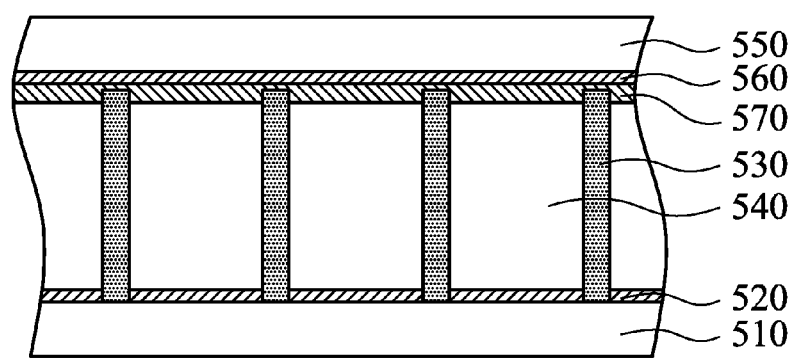
FIG. 5 is a cross section of an embodiment of the substrate structure assembly taken along A-A line of FIG. 4.

FIG. 5 is a cross section of an embodiment of the substrate structure assembly taken along A-A line of FIG. 4. Referring to FIG. 5, the combination of the first and second substrate structure includes the first substrate 510 and second substrate 550 opposed to each other with a plurality of parallel LC channel 540 for containing respective color LCs interposed therebetween. A linear electrode 520 such as a pixel electrode along the first direction is disposed on the first substrate 510. A linear electrode 560 such as a common electrode along the second direction is disposed on the second substrate 550. The patterned enclosed structure 530 and the adhesion layer 570 between the first substrate 510 and second substrate 550 are tightly combined to prevent LC overflow between adjacent LC channels during filling of the color LCs.

Figure 6A:
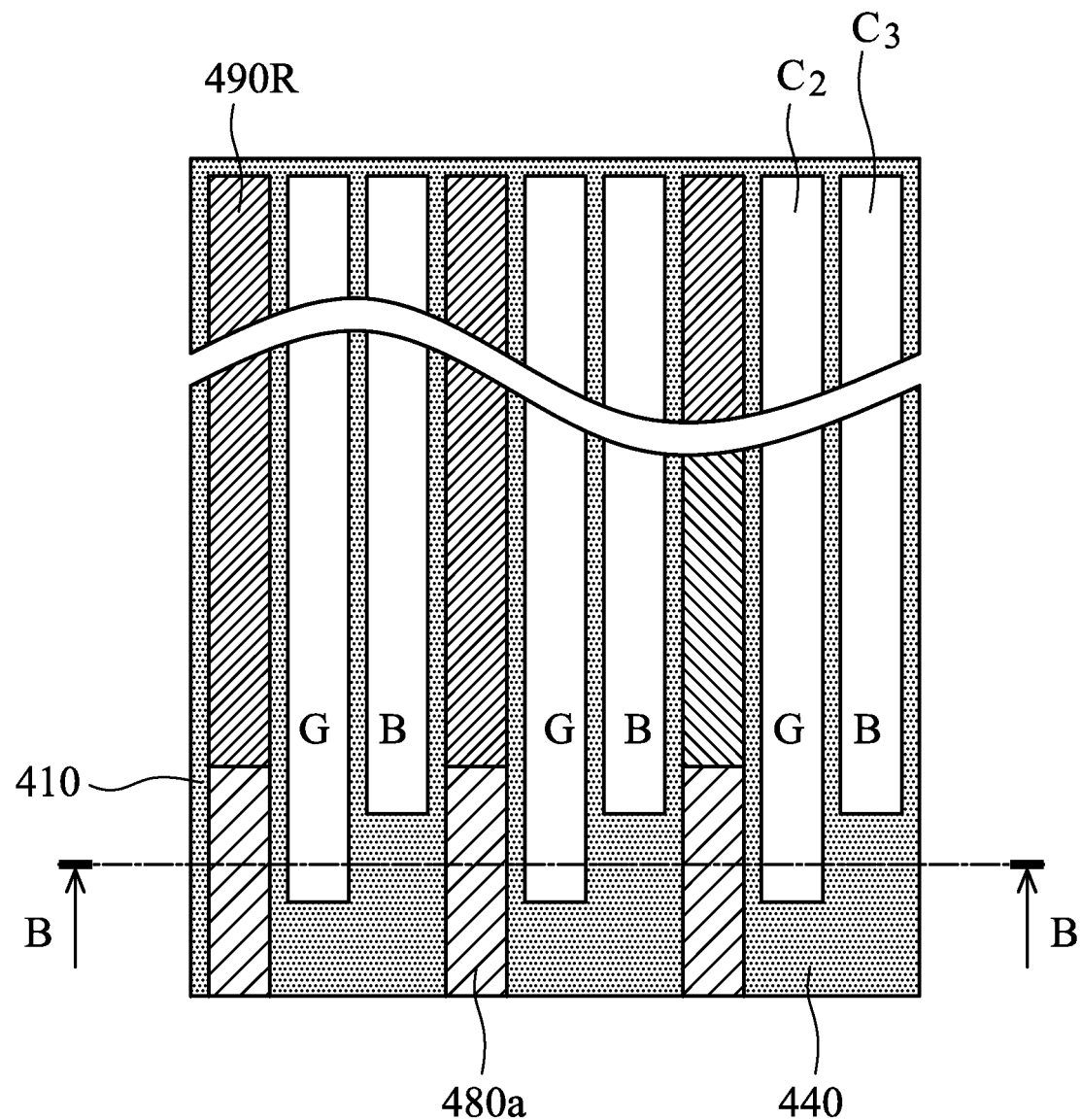
FIGS. 6A-6C are schematic views of an embodiment of each step of filling each color LC into respective LC channels of the disclosure.
Figure 6B:
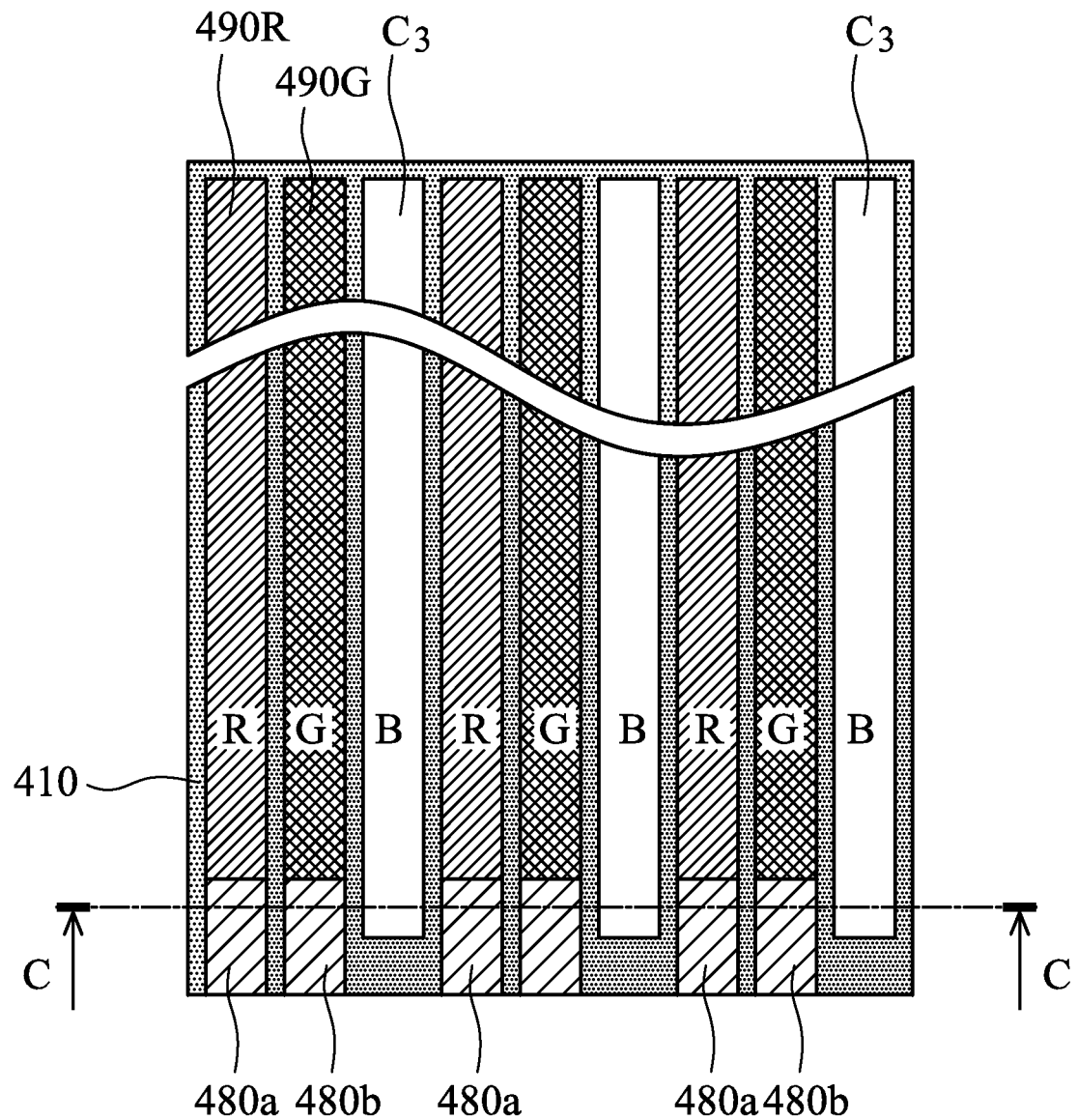
Figure 6C:
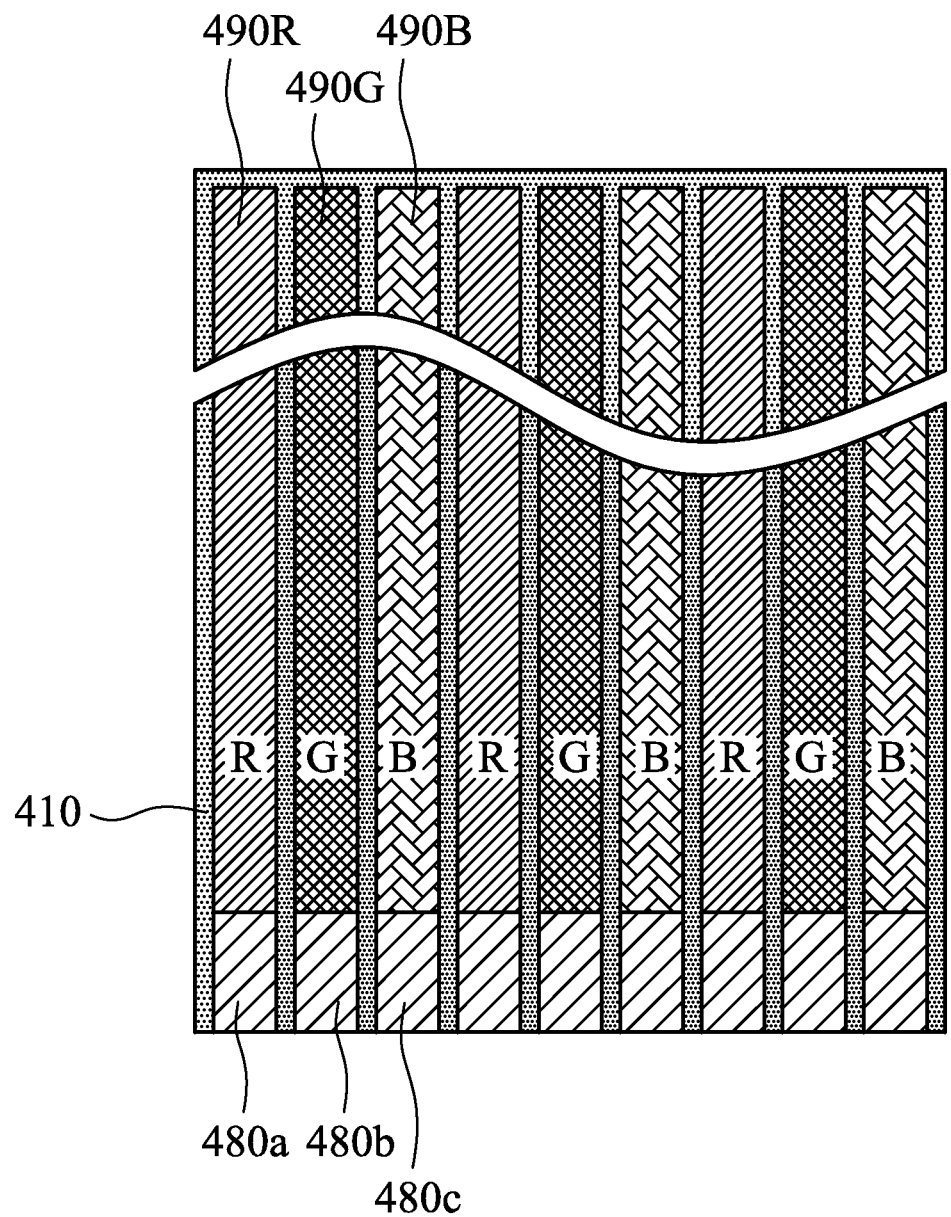

FIGS. 6A-6C are schematic views of an embodiment of each step of filling each color LC into respective LC channels of the disclosure. Referring to FIG. 6A, a first color (e.g., red) cholestic LC 490R is filled into a first LC channel, and the first LC channel is then sealed by a first sealant 480a. For example, a red cholesteric CL material comprises mixture of red dye and twisted nematic liquid crystal layer doped with a chiral agent. The first sealant 480a can comprise a light solidified material or a thermosetting material. Next, a first cutting procedure is performed such as along cutting line B-B to uncover the second stripe LC channel $C_2$. The first cutting procedure can be performed by dice-cutting and laser-cutting.

Referring to FIG. 6B, a second color (e.g., green) cholestic LC 490G is filled into a second LC channel, and the second LC channel is then sealed by a second sealant 480b. For example, a green cholesteric CL material comprises mixture of green dye and twisted nematic liquid crystal layer doped with a chiral agent. The second sealant 480b can comprise a light solidified material or a thermosetting material. Next, a second cutting procedure is performed such as along cutting line C-C to uncover the third stripe LC channel $C_3$. The second cutting procedure can be performed by dice-cutting and laser-cutting.

Referring to FIG. 6C, a third color (e.g., blue) cholestic LC 490B is filled into a third LC channel, and the third LC channel is then sealed by a third sealant 480c. For example, a blue cholesteric CL material comprises mixture of blue dye and twisted nematic liquid crystal layer doped with a chiral agent. The third sealant 480c can comprise a light solidified material or a thermosetting material. After all the three color cholesteric LCs are filled and sealed, fabrication of the single layer color cholesteric LCD device is completed.

Note that in the abovementioned description in some embodiments, each color cholesteric LC layer of the disclosure can further comprise polymer dispersed liquid crystal (PDLC) or polymer stabilized liquid crystal (PSLC) materials. An LC fluid containing monomer or oligomer units would be filled into stripe LC channels. After illuminated by UV light, the LCs fluid containing monomer or oligomer units is polymerized into polymer dispersed liquid crystal (PDLC). Using PDLC can omit sealing procedures of each stripe LC channel. For example, after the first and second substrate structures are assembled, a first color liquid crystal is filled into the first LC channel. After the first color liquid crystal is polymerized, the assembly is cut to uncover a second opening of the second LC channel. Next, a second color liquid crystal is filled into the second LC channel. After the second color liquid crystal is polymerized, the assembly is cut to uncover a third opening of the third LC channel. A third color liquid crystal is filled into the third LC channel. The third color liquid crystal is then polymerized. After all the three color cholesteric LC are filled and polymerized, fabrication of the single layer color cholesteric LCD device is completed.

Note that there are additional steps not mentioned here, which are required to complete the single layer color cholesteric LCD device, but which are not essential to an understanding of the disclosure and are well-known to those with ordinary skill in the art.

Embodiments of the disclosure are advantageous in that an enclosed structure dividing different length of LC channels is formed on one substrate, and an adhesion layer is applied on the other substrate. After the two opposing substrate are assembled, the enclosed structure and the adhesion layer are tightly combined to prevent LC overflow between adjacent LC channels during filling of the color LCs. The assembled structure is sequentially cut, filled red, green, and blue LC, and sealed to prevent color mixing and reduce color saturation. Thus, simplifying fabrication processes and reducing production costs.

Although the above process may eliminate color mixing and reduce color saturation, problems such as a high driving voltage and a low contrast ratio due to the adhesive layer still exist. Note that the patterned enclosed structure 320 cannot be directly adhered to the second substrate 350 due to the heteromaterials therebetween. As such, a further method of assembling the first substrate 310 and second substrate 350 is disclosed below.

Figure 7:
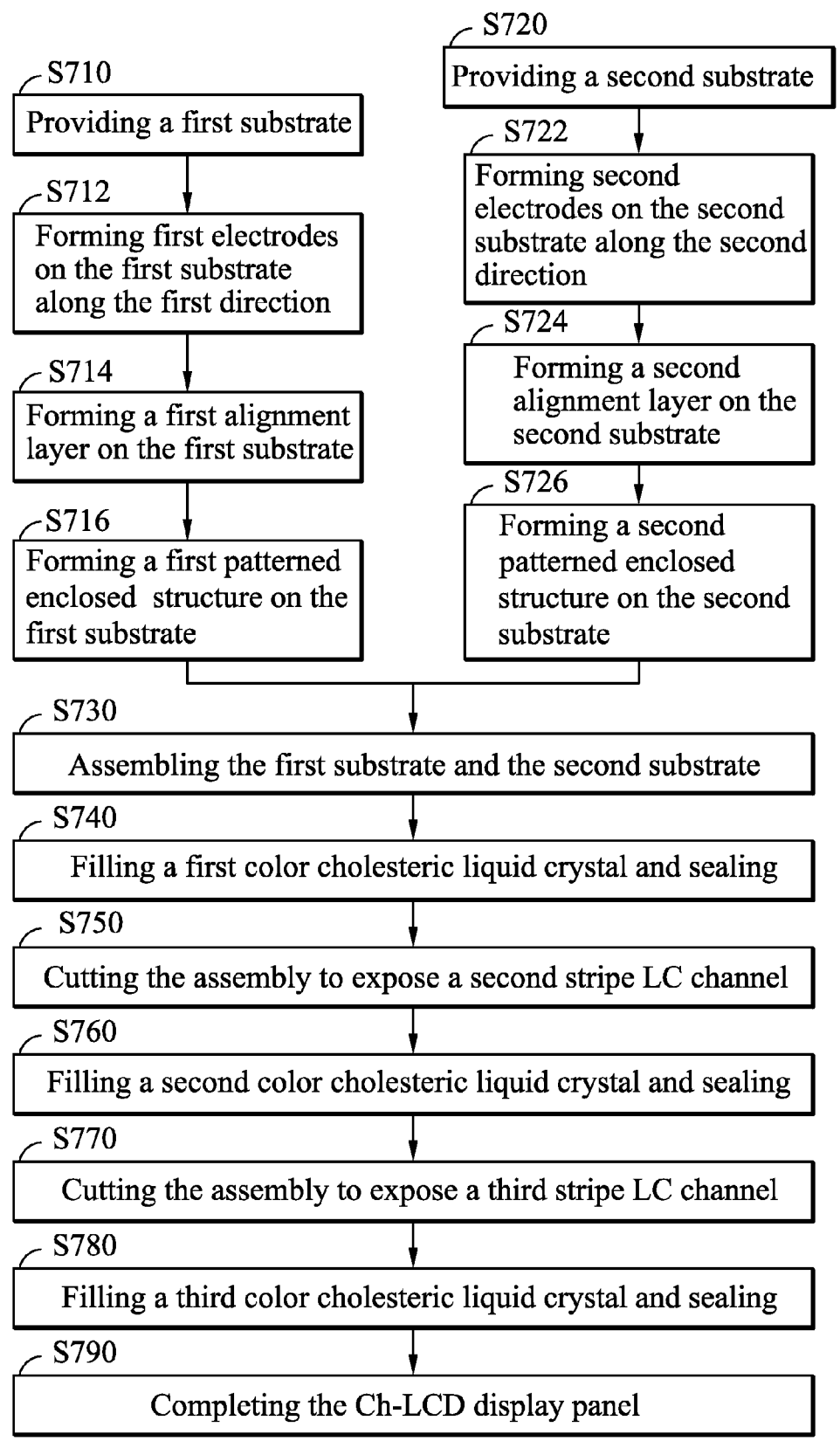
FIG. 7 is a flowchart illustrating an exemplary embodiment of a fabrication method for a single layer color cholesteric LCD device according to the disclosure.

FIG. 7 is a flowchart illustrating an exemplary embodiment of a fabrication method for a single layered color cholesteric LCD device according to the disclosure. First, preparation of a first substrate structure (such as an upper substrate structure) is conducted including, providing a first substrate (S710) and forming a patterned first electrode along the first direction on the first substrate (S712). Subsequently, an optional first alignment layer is formed on the first substrate covering the first electrode (S714). In some embodiments, the step S714 can be saved. A first patterned enclosed structure is then formed on the first substrate (S716). The patterned enclosed structure includes a plurality of stripe wall structures, a same end of each stripe wall structure is connected to and perpendicular to a straight seal line, and a solid bulk region connected to the other end of each of the stripe wall structures, thereby dividing a first LC channel with a first opening, a second closed LC channel, and a third closed LC channel.

Preparation of a second substrate structure (such as a lower substrate structure) is conducted including providing a second substrate (S720) and forming a patterned second electrode along the second direction on the second substrate (S722). An optional second alignment layer is formed on the second substrate covering the second electrode (S724). In some embodiments, the step S724 can be saved. A second patterned enclosed structure is then formed on the second substrate (S726). Note that the first and second patterned enclosed structures are mirror-symmetrical to each other. Similarly, the second patterned enclosed structure includes a plurality of stripe wall structures, a same end of each stripe wall structure is connected to and perpendicular to a straight seal line, and a solid bulk region connected to the other end of each of the stripe wall structures, thereby dividing a first LC channel with a first opening, a second closed LC channel, and a third closed LC channel.

The first and second substrate structures are assembled opposite to each other with a gap interposed therebetween (S730). The first patterned enclosed structure is tightly adhered to the second enclosed structure to prevent overflowing of adjacent LC channels during the filling of the color LCs. In some embodiments, the first and second patterned enclosed structures are composed of a photoresist. Because the first and second patterned enclosed structures are mirror-symmetrical to each other, they can utilize a normal face and reverse face of same photomask, respectively. The exposed photoresist can be developed to define the adhesive first enclosed structure and the adhesive second enclosed structure. After adhering the first enclosed structure to the second enclosed structure, the adhered structure are then hard-baked for solidification.

A first color cholesteric LC is filled in a first stripe LC channel and then sealed (S740). The assembly structure is cut to expose a second stripe LC channel (S750). A second color cholesteric LC is filled in the second stripe LC channel and then sealed (S760). The assembly structure is cut to expose a third stripe LC channel (S770). A third color cholesteric LC is filled in the third stripe LC channel and then sealed (S780). After all the three color cholesteric LCs are filled into the stripe LC channels and sealed, fabrication of the single layer color cholesteric LCD device is completed. Note that the sealing step can be directly polymerizing the color cholesteric LCs when the LCs including polymer dispersed liquid crystal (PDLC) or a polymer stabilized liquid crystal (PSLC).

Figure 8A:
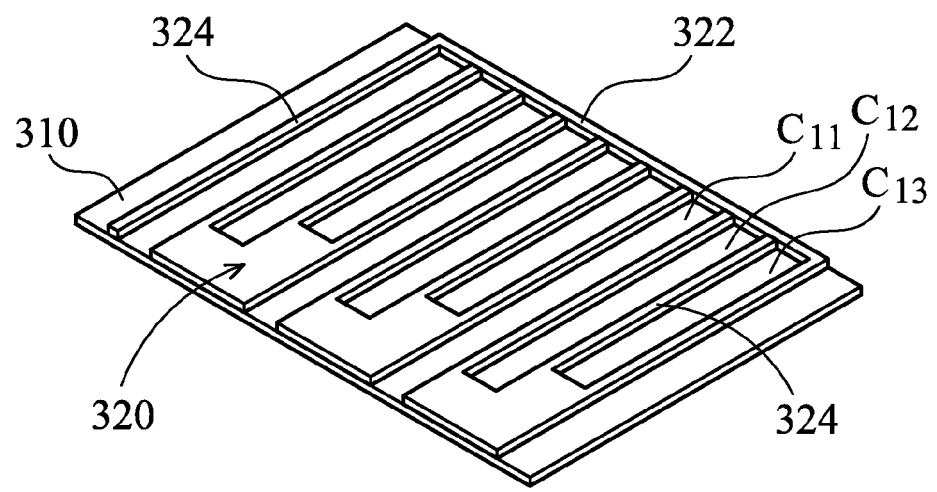
FIGS. 8A-8C are schematic views of an exemplary embodiment of each assembly step of the first and second substrate structures of the disclosure.
Figure 8B:
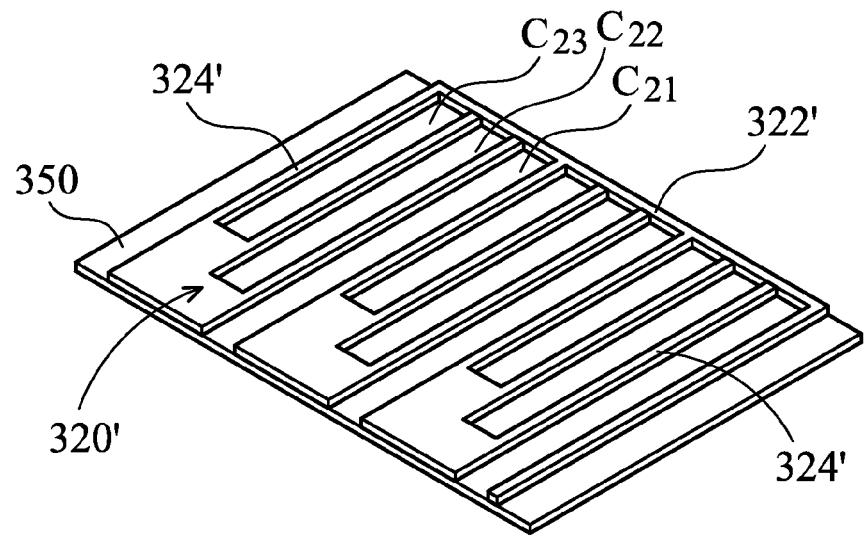
Figure 8C:
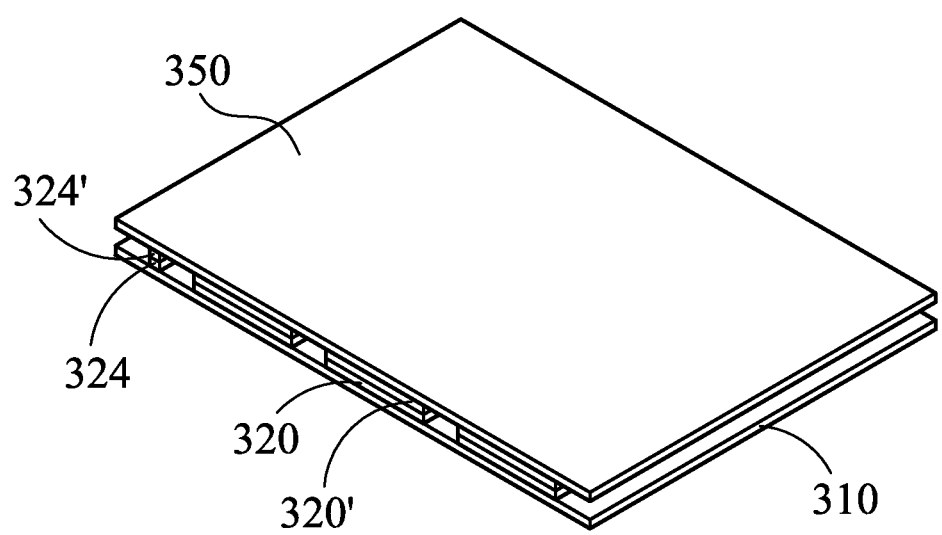

FIGS. 8A-8C are schematic views of an exemplary embodiment of each assembly step of the first and second substrate structures of the disclosure. Referring to FIG. 8A, a patterned enclosed structure 320 is formed on the first substrate 310. The patterned enclosed structure 320 comprises a plurality of stripe wall structures 324. A same end of each stripe wall structures 324 connects to and is perpendicular to a straight end line 322 to divide a first LC channel $C_{11}$ with a first LC filling opening, a second closed LC channel $C_{12}$, and a third closed LC channel $C_{13}$. The length of the first LC channel $C_{11}$ exceeds that of the second LC channel $C_{12}$, and the length of the second LC channel $C_{12}$ exceeds that of the third LC channel $C_{13}$. The first substrate can be made of rigid substrates or flexible substrates. For example, flexible substrates comprise polycarbonate (PC) substrates, polyethersulfone (PES) substrates, polyethylene terephthalate (PET) substrates, and polyimide (PI) substrates.

The first substrate 310 may further comprise circuit elements for controlling pixel electrodes such as a thin film transistor (TFT) and a capacitor. Alternatively and optionally, the first substrate comprises pixel electrodes and a first alignment layer overlying the first substrate. The patterned enclosed structure can be formed by any well-known patterning processes such as lithography and screen printing processes, and can be made of a photoresist material.

Referring to FIG. 8B, a patterned enclosed structure 320' is formed on the second substrate 350. The patterned enclosed structure 320' is mirror-symmetrical to the patterned enclosed structure 320. Similarly, the patterned enclosed structure 320' comprises a plurality of stripe wall structures 324'. A same end of each stripe wall structure 324' connects to and is perpendicular to a straight end line 322' to divide a first LC channel $C_{21}$ with a first LC filling opening, a second closed LC channel $C_{22}$, and a third closed LC channel $C_{23}$. The length of the first LC channel $C_{21}$ exceeds that of the second LC channel $C_{22}$, and the length of the second LC channel $C_{22}$ exceeds that of the third LC channel $C_{23}$. The second substrate 350 can be made of rigid substrates or flexible substrates. For example, flexible substrates comprise polycarbonate (PC) substrates, polyethersulfone (PES) substrates, polyethylene terephthalate (PET) substrates, and polyimide (PI) substrates.

The second substrate 350 may further comprise circuit elements for controlling pixel electrodes such as a thin film transistor (TFT) and a capacitor. Alternatively and optionally, the second substrate 350 comprises pixel electrodes (or common electrodes) and a second alignment layer overlying the second substrate. The patterned enclosed structure 320' can be formed by any well-known patterning processes such as lithography and screen printing processes, and can be made of a photoresist material. In one embodiment, the patterned enclosed structures 320 and 320' are made of the same material, and can be defined by the same photomask having a normal face or reverse face, respectively.

Referring to FIG. 8C, the first substrate 310 and the second substrate 350 are assembled opposing each other such that the first patterned enclosed structure 320 is tightly adhered to the patterned enclosed structure 320' to prevent the LCs from overflowing between adjacent LC channels during filling of the color LCs. After the adhering step, the LCs channels $C_{11}$, $C_{12}$, and $C_{13}$ divided by the patterned enclosed structure 320 and the LCs channels $C_{21}$, $C_{22}$, and $C_{23}$ divided by the patterned enclosed structure 320' are combined to the LCs channels $C_1$, $C_2$, and $C_3$ as shown in FIG. 9.

Figure 9:
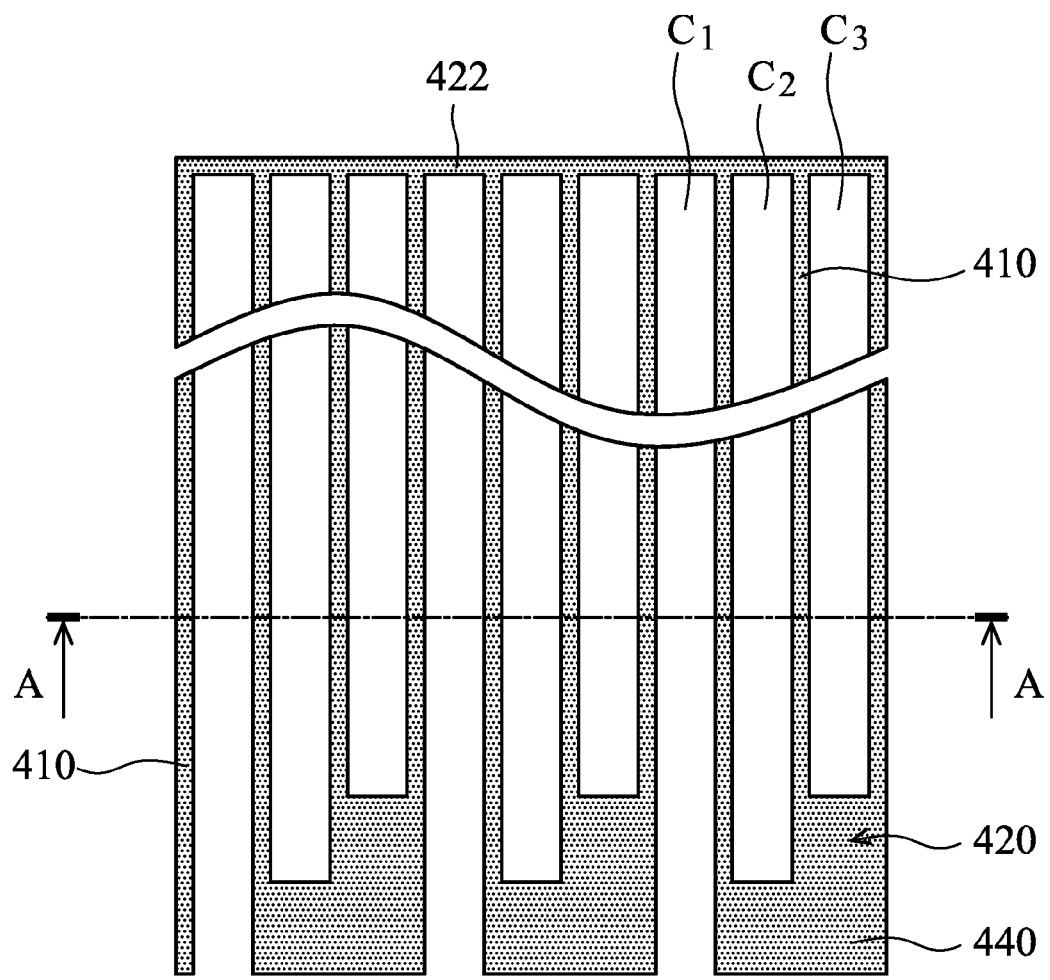
FIG. 9 is a plan view of an embodiment of the assembly of the disclosure.

FIG. 9 is a plan view of an embodiment of the assembly of the disclosure. In FIG. 9, a patterned enclosed structure 420 is formed by adhering the patterned enclosed structure 320 to the patterned enclosed structure 320'. The patterned enclosed structures 320 and 320' are adhesive, thereby saving requirement for an adhesion layer as described above. The patterned enclosed structure 420 comprises a plurality of stripe wall structures 410. A same end of each stripe wall structures 410 connects to and is perpendicular to a straight end line 422 and the other end of the stripe wall structures 410 connects to a solid bulk region 440, thereby dividing a first LC channel $C_1$ with a first LC filling opening, a second closed LC channel $C_2$, and a third closed LC channel $C_3$. The length of the first LC channel $C_1$ exceeds that of the second LC channel $C_2$, and the length of the second LC channel $C_2$ exceeds that of the third LC channel $C_3$. The bulk region 440 can enhance adhesion between the patterned enclosed structures 320 and 320', thereby preventing the overflow of the color LCs between adjacent the LC channels during filling of the color LCs.

Figure 10:
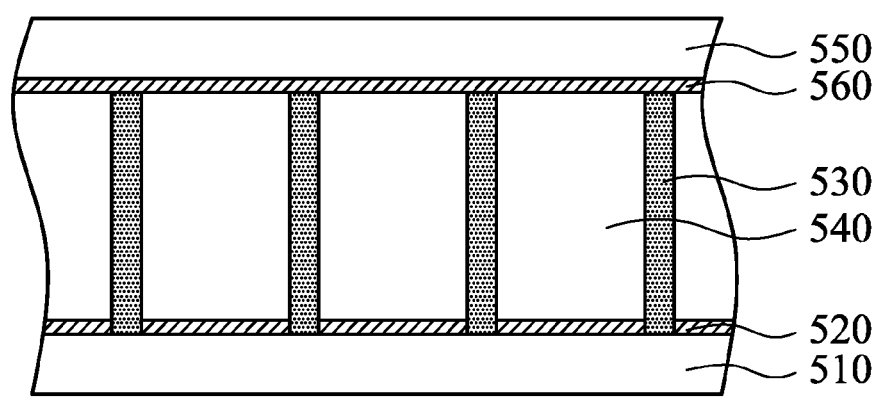
FIG. 10 is a cross section of an embodiment of the substrate structure assembly taken along A-A line of FIG. 9.

FIG. 10 is a cross section of an embodiment of the substrate structure assembly taken along A-A line of FIG. 9. Referring to FIG. 10, the combined first and second substrate structure includes the first substrate 510 and second substrate 550 opposed to each other with a plurality of parallel LC channels 540 for containing respective color LCs interposed therebetween in later processes. An electrode 520 such as a pixel electrode is disposed on the first substrate 510. An electrode 560 such as a common electrode is disposed on the second substrate 550. The patterned enclosed structure 530, formed by adhering the patterned enclosed structure 320 to the patterned enclosed structures 320' between the first substrate 510 and second substrate 550, is tightly combined to prevent LC overflow between adjacent LC channels during filling of the color LCs.

Figure 11A:
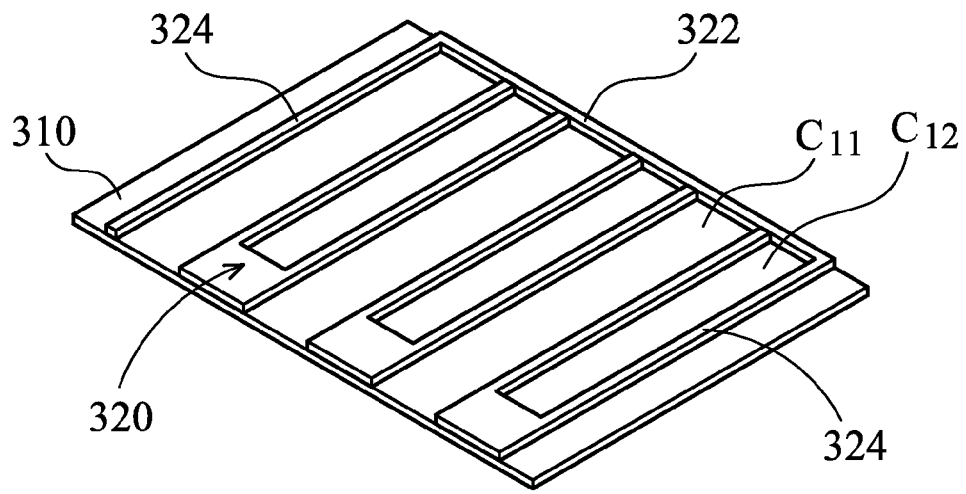
FIGS. 11A-11C are schematic views of an exemplary embodiment of each assembly step of the first and second substrate structures of the disclosure.
Figure 11B:
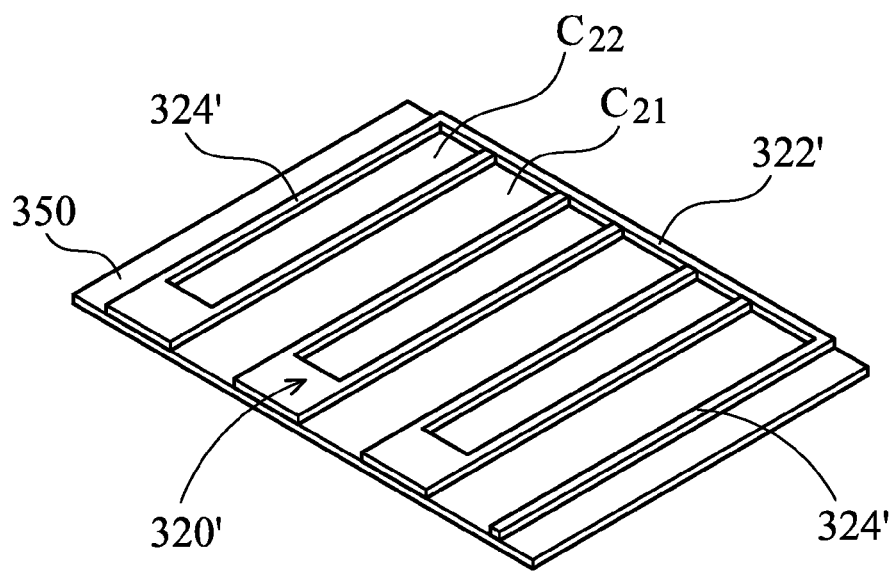
Figure 11C:
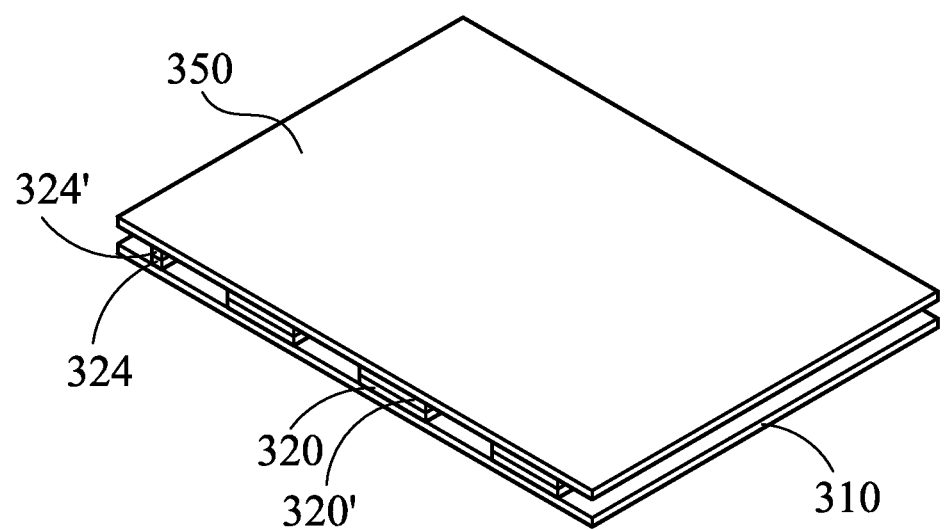

FIGS. 11A-11C are schematic views of another exemplary embodiment of each assembly step of the first and second substrate structures of the disclosure. Referring to FIG. 11A, a patterned enclosed structure 320 is formed on the first substrate 310. The patterned enclosed structure 320 comprises a plurality of stripe wall structures 324. A same end of each stripe wall structures 324 connects to and is perpendicular to a straight end line 322 to divide a first LC channel $C_{11}$ with a first LC filling opening and a second closed LC channel $C_{12}$. The length of the first LC channel $C_{11}$ exceeds that of the second LC channel $C_{12}$. The first substrate can be made of rigid substrates or flexible substrates. For example, flexible substrates comprise polycarbonate (PC) substrates, polyethersulfone (PES) substrates, polyethylene terephthalate (PET) substrates, and polyimide (PI) substrates.

The first substrate 310 may further comprise circuit elements for controlling pixel electrodes such as a thin film transistor (TFT) and a capacitor. Alternatively and optionally, the first substrate comprises pixel electrodes and a first alignment layer overlying the first substrate. The patterned enclosed structure can be formed by any well-known patterning processes such as lithography and screen printing processes, and can be made of a photoresist material.

Referring to FIG. 11B, a patterned enclosed structure 320' is formed on the second substrate 350. The patterned enclosed structure 320' is mirror-symmetrical to the patterned enclosed structure 320. Similarly, the patterned enclosed structure 320' comprises a plurality of stripe wall structures 324'. A same end of each stripe wall structure 324' connects to and is perpendicular to a straight end line 322' to divide a first LC channel $C_{21}$ with a first LC filling opening and a second closed LC channel $C_{22}$. The length of the first LC channel $C_{21}$ exceeds that of the second LC channel $C_{22}$. The second substrate 350 can be made of rigid substrates or flexible substrates. For example, flexible substrates comprise polycarbonate (PC) substrates, polyethersulfone (PES) substrates, polyethylene terephthalate (PET) substrates, and polyimide (PI) substrates.

The second substrate 350 may further comprise circuit elements for controlling pixel electrodes such as a thin film transistor (TFT) and a capacitor. Alternatively and optionally, the second substrate 350 comprises pixel electrodes (or common electrodes) and a second alignment layer overlying the second substrate. The patterned enclosed structure 320' can be formed by any well-known patterning processes such as lithography and screen printing processes, and can be made of a photoresist material. In one embodiment, the patterned enclosed structures 320 and 320' are made of the same material, and can be defined by the same photomask having a normal face or reverse face, respectively.

Referring to FIG. 11C, the first substrate 310 and the second substrate 350 are assembled opposing each other such that the first patterned enclosed structure 320 is tightly adhered to the patterned enclosed structure 320' to prevent the LCs from overflowing between adjacent LC channels during filling of the color LCs. After the adhering step, the LCs channels $C_{11}$ and $C_{12}$ divided by the patterned enclosed structure 320 and the LCs channels $C_{21}$ and $C_{22}$ divided by the patterned enclosed structure 320' are combined to the LCs channels $C_1$ and $C_2$ as shown in FIG. 12.

Figure 12:
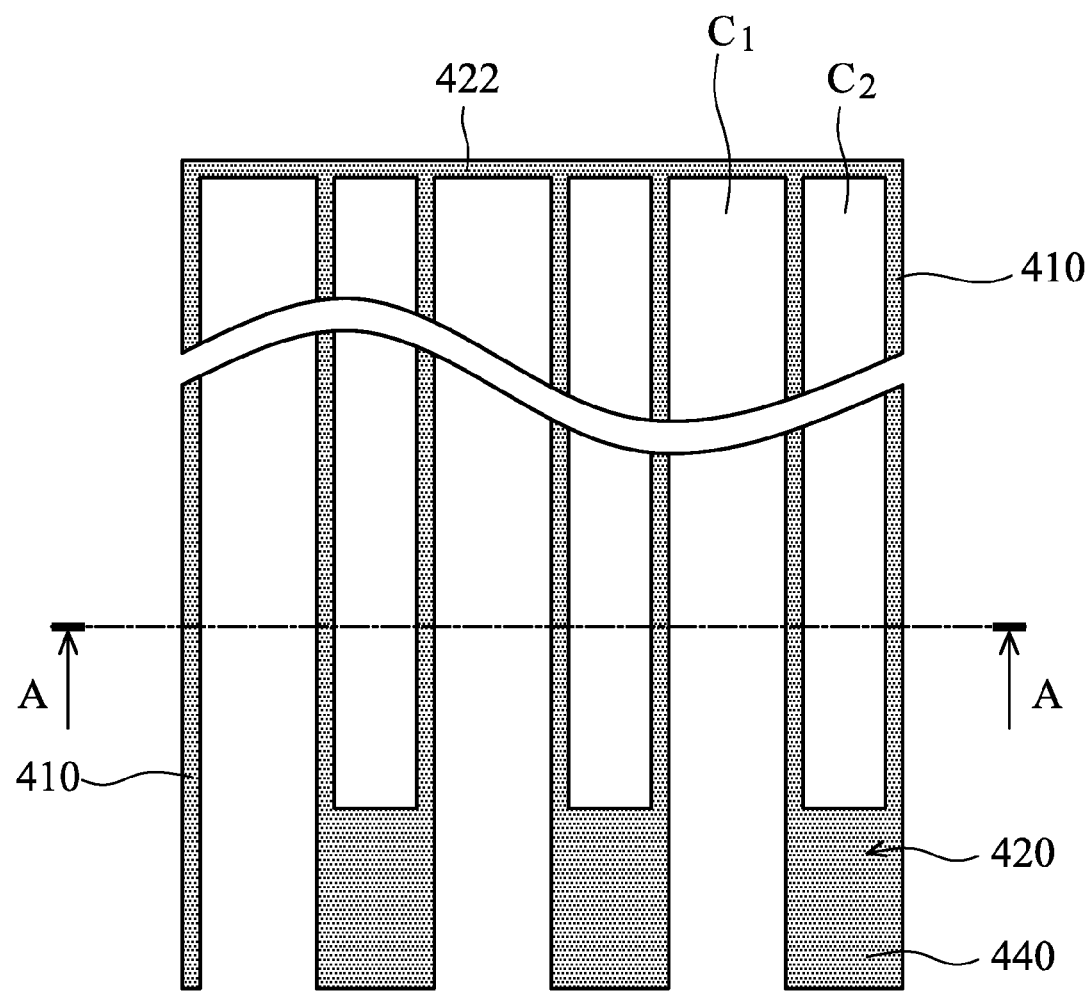
FIG. 12 is a plan view of an embodiment of the assembly of the disclosure.

FIG. 12 is a plan view of an embodiment of the assembly of the disclosure. In FIG. 12, a patterned enclosed structure 420 is formed by adhering the patterned enclosed structure 320 to the patterned enclosed structure 320'. The patterned enclosed structures 320 and 320' are adhesive, thereby saving requirement for an adhesion layer as described above. The patterned enclosed structure 420 comprises a plurality of stripe wall structures 410. A same end of each stripe wall structures 410 connects to and is perpendicular to a straight end line 422 and the other end of the stripe wall structures 410 connects to a solid bulk region 440, thereby dividing a first LC channel $C_1$ with a first LC filling opening and a second closed LC channel $C_2$. The length of the first LC channel $C_1$ exceeds that of the second LC channel $C_2$. The bulk region 440 can enhance adhesion between the patterned enclosed structures 320 and 320', thereby preventing the overflow of the color LCs between adjacent the LC channels during filling of the color LCs.

Figure 13:
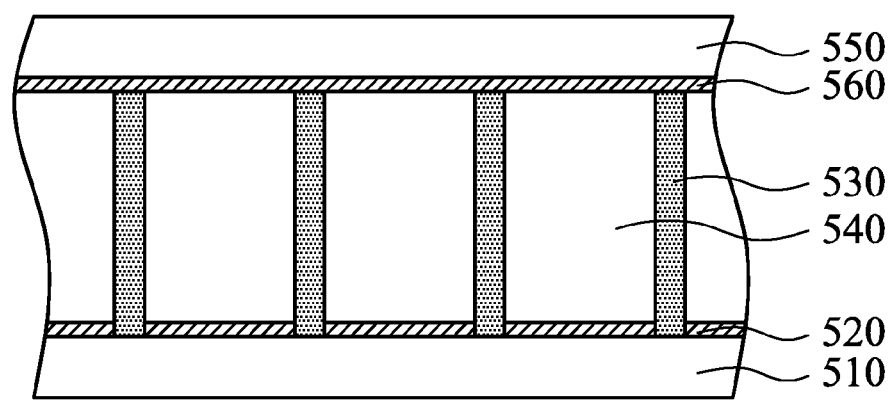
FIG. 13 is a cross section of an embodiment of the substrate structure assembly taken along A-A line of FIG. 12.

FIG. 13 is a cross section of an embodiment of the substrate structure assembly taken along A-A line of FIG. 12. Referring to FIG. 13, the combined first and second substrate structure includes the first substrate 510 and second substrate 550 opposed to each other with a plurality of parallel LC channels 540 for containing respective color LCs interposed therebetween in later processes. An electrode 520 such as a pixel electrode is disposed on the first substrate 510. An electrode 560 such as a common electrode is disposed on the second substrate 550. The patterned enclosed structure 530, formed by adhering the patterned enclosed structure 320 to the patterned enclosed structures 320' between the first substrate 510 and second substrate 550, is tightly combined to prevent LC overflow between adjacent LC channels during filling of the color LCs.

The following processes such as filling the LCs and cutting of the assembly are similar to above processes described with FIGS. 6A-6C and therefore omitted here. The only difference here is only two not three LCs are filled to the LC channels, respectively. In one embodiment, the LCs and the pattern enclosed structure have a contact angle of 10° to 15°, and the LCs and the electrode layer have a contact angle of 10° to 20°. In one embodiment, the LCs and the pattern enclosed structure have a contact angle of 20° to 25°, and the LCs and the electrode layer have a contact angle of 10° to 20°. In one embodiment, the LCs and the pattern enclosed structure have a contact angle of 30° to 35°, and the LCs and the electrode layer have a contact angle of 10° to 20°. The filling LC rate determined the LCs alignment behaviors during filling the LCs. Proper contact angles between the LCs and the patterned enclosed structure/electrode layer as described above result in uniform display brightness.

It should be understood that the color cholesteric liquid crystal display device may include two colors as shown in FIGS. 11-13, three colors as shown in FIGS. 8-10, and more colors if necessary.

Comparing to the processes in FIGS. 2-5, the processes in FIGS. 8-13 may save the adhesion layer. As such, the final product may have lower driving voltage and higher contrast ratio without the adhesion layer.

While the disclosure has been described by way of example and in terms of the several embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A fabrication method for a color cholesteric liquid crystal display device, comprising:
   providing a first substrate having a first patterned enclosed structure thereon;
   providing a second substrate having a second patterned enclosed structure thereon, wherein the second patterned enclosed structure is mirror-symmetrical to the first patterned enclosed structure;
   adhering the first patterned enclosed structure to the second patterned enclosed structure for assembling the first and second substrates to define a first LC channel with a first opening, a second LC channel, and a third LC channel, wherein the first LC channel is longer than the second LC channel, and the second LC channel is longer than the third LC channel;
   filling a first color liquid crystal into the first LC channel and sealing the first LC channel with a first seal material;
   cutting the assembly to expose a second opening of the second LC channel;
   filling a second color liquid crystal into the second LC channel and sealing the second LC channel with a second seal material;
   cutting the assembly to expose a third opening of the third LC channel; and
   filling a third color liquid crystal into the third LC channel and sealing the third LC channel with a third seal material.

2. The fabrication method for the color cholesteric liquid crystal display device as claimed in claim 1, wherein the first and second patterned enclosed structures comprise photoresist materials.

3. The fabrication method for the color cholesteric liquid crystal display device as claimed in claim 1, wherein the first patterned enclosed structure comprises a plurality of first stripe wall structures, a first straight seal line connected to and perpendicular to a same end of each of the first stripe wall structures, and a first solid bulk region with a relatively larger width than the first stripe wall structures connected to the other end of each of the first stripe wall structures.

4. The fabrication method for the color cholesteric liquid crystal display device as claimed in claim 1, wherein the second patterned enclosed structure comprises a plurality of second stripe wall structures, a second straight seal line connected to and perpendicular to a same end of each of the second stripe wall structures, and a second solid bulk region with a relatively larger width than the second stripe wall structures connected to the other end of each of the second stripe wall structures.

5. The fabrication method for the color cholesteric liquid crystal display device as claimed in claim 1, wherein the first and second patterned enclosed structures are made of the same material.

6. The fabrication method for the color cholesteric liquid crystal display device as claimed in claim 1, wherein the first color liquid crystal comprises a red liquid crystal, the second color liquid crystal comprises a green liquid crystal, and the third color liquid crystal comprises a blue liquid crystal.

7. The fabrication method for the color cholesteric liquid crystal display device as claimed in claim 6, wherein each of the red liquid crystal, the green liquid crystal, and the blue liquid crystal comprises a respective color dye and a twisted nematic liquid crystal layer doped with a chiral agent.

8. The fabrication method for the color cholesteric liquid crystal display device as claimed in claim 1, wherein the first seal material, the second seal material, and the third seal material comprise a light solidified material or a thermosetting material.

9. A fabrication method for a color cholesteric liquid crystal display device, comprising:
   providing a first substrate having a first patterned enclosed structure thereon;
   providing a second substrate having a second patterned enclosed structure thereon, wherein the second patterned enclosed structure is mirror-symmetrical to the first patterned enclosed structure;
   adhering the first patterned enclosed structure to the second patterned enclosed structure for assembling the first and second substrates to define a first LC channel with a first opening, a second LC channel, and a third LC channel, wherein the first LC channel is longer than the second LC channel, and the second LC channel is longer than the third LC channel;
   filling a first color liquid crystal into the first LC channel;
   polymerizing the first color liquid crystal;
   cutting the assembly to expose a second opening of the second LC channel;
   filling a second color liquid crystal into the second LC channel;
   polymerizing the second color liquid crystal;

cutting the assembly to expose a third opening of the third LC channel;
filling a third color liquid crystal into the third LC channel; and
polymerizing the third color liquid crystal.

10. The fabrication method for the color cholesteric liquid crystal display device as claimed in claim 9, wherein each of the first color liquid crystal, the second color liquid crystal, and the third color liquid crystal comprises a polymer dispersed liquid crystal (PDLC) or a polymer stabilized liquid crystal (PSLC).

11. A fabrication method for a color cholesteric liquid crystal display device, comprising:
providing a first substrate having a first patterned enclosed structure thereon;
providing a second substrate having a second patterned enclosed structure thereon, wherein the second patterned enclosed structure is mirror-symmetrical to the first patterned enclosed structure;
adhering the first patterned enclosed structure to the second patterned enclosed structure for assembling the first and second substrates to define a first LC channel with a first opening and a second LC channel, wherein the first LC channel is longer than the second LC channel;
filling a first color liquid crystal into the first LC channel and sealing the first LC channel with a first seal material;
cutting the assembly to expose a second opening of the second LC channel; and
filling a second color liquid crystal into the second LC channel and sealing the second LC channel with a second seal material.

12. The fabrication method for the color cholesteric liquid crystal display device as claimed in claim 11, wherein the first and second patterned enclosed structures comprise photoresist materials.

13. The fabrication method for the color cholesteric liquid crystal display device as claimed in claim 11, wherein the first patterned enclosed structure comprises a plurality of first stripe wall structures, a first straight seal line connected to and perpendicular to a same end of each of the first stripe wall structures, and a first solid bulk region connected to the other end of each of the first stripe wall structures.

14. The fabrication method for the color cholesteric liquid crystal display device as claimed in claim 11, wherein the second patterned enclosed structure comprises a plurality of second stripe wall structures, a second straight seal line connected to and perpendicular to a same end of each of the second stripe wall structures, and a second solid bulk region connected to the other end of each of the second stripe wall structures.

15. The fabrication method for the color cholesteric liquid crystal display device as claimed in claim 11, wherein the first and second patterned enclosed structures are made of the same material.

16. The fabrication method for the color cholesteric liquid crystal display device as claimed in claim 11, wherein each of the color liquid crystals comprises a respective color dye and a twisted nematic liquid crystal layer doped with a chiral agent.

17. The fabrication method for the color cholesteric liquid crystal display device as claimed in claim 11, wherein the first seal material and the second seal material comprise a light solidified material or a thermosetting material.

18. A fabrication method for a color cholesteric liquid crystal display device, comprising:
providing a first substrate having a first patterned enclosed structure thereon;
providing a second substrate having a second patterned enclosed structure thereon, wherein the second patterned enclosed structure is mirror-symmetrical to the first patterned enclosed structure;
adhering the first patterned enclosed structure to the second patterned enclosed structure for assembling the first and second substrates to define a first LC channel with a first opening and a second LC channel, wherein the first LC channel is longer than the second LC channel;
filling a first color liquid crystal into the first LC channel;
polymerizing the first color liquid crystal;
cutting the assembly to expose a second opening of the second LC channel;
filling a second color liquid crystal into the second LC channel; and
polymerizing the second color liquid crystal.

19. The fabrication method for the color cholesteric liquid crystal display device as claimed in claim 18, wherein each of the first color liquid crystal, the second color liquid crystal comprises a polymer dispersed liquid crystal (PDLC) or a polymer stabilized liquid crystal (PSLC).

* * * * *